Nov. 9, 1954

W. T. REA 2,694,160

EXPANDABLE STRAIGHT LINE TRAJECTORY
RADAR AND SONAR INDICATOR

Filed Aug. 31, 1948

HORIZONTAL DEFLECTING VOLTAGE

VERTICAL DEFLECTING VOLTAGE

SWEEP PATTERN

MARKERS

INVENTOR
W. T. REA

BY
H. O. Wright
ATTORNEY

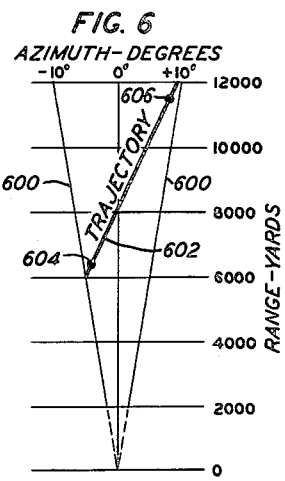
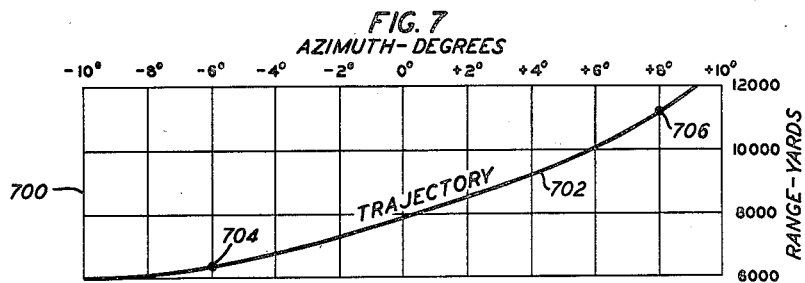
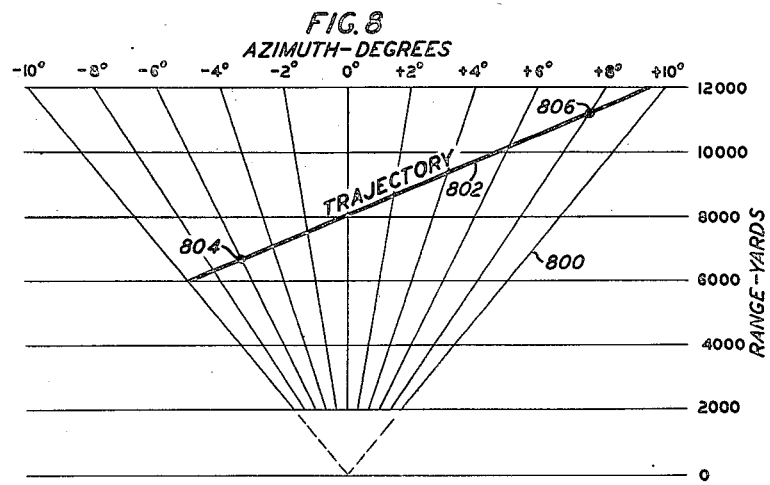

2,694,160

EXPANDABLE STRAIGHT LINE TRAJECTORY RADAR AND SONAR INDICATOR

Wilton T. Rea, Manhasset, N. Y., assignor to Bell Telephone Laboratories, Incorporated, New York, N. Y., a corporation of New York Application August 31, 1948, Serial No. 47,065

1 Claim. (Cl. 315—24)

This invention relates to special sweep controlling circuits for the cathode ray indicator for sector scanning radars and for other types of sector scanning direction and range determining systems.

More particularly it relates to sweep controlling circuits for radars, sonars, and other types of ranging and directional systems employing sector scanning and in which it is desired to expand a rectilinear (or straight line) representation on a cathode ray oscilloscope, or the like, in both the azimuth and range dimensions without substantially distorting the linear character of the representation.

An especial use of the arrangements of the invention is in connection with radars designed for "motor location" by a method which includes spotting two points on the trajectory of a mortar shell to establish the straight line projection of said trajectory on the earth's surface. A hostile mortar will then be known to lie on an extension of this straight line projection and its probable position on the line can be closely calculated from a knowledge of the characteristics of the weapon and the shell being employed, together with the elevation of the trajectory at the two points spotted.

For reasons which will become apparent hereinunder, the indications provided by arrangements of the invention are designated "trapezoidal B" class (or type) indications. This type of display is primarily intended for use with radar, and other types of ranging and directional systems which employ a highly directive antenna or a highly directive energy emitting and/or receiving device to scan a relatively narrow sector of azimuth angle, for example, a sector of from 5 to 30 degrees in azimuth.

By way of example, in accordance with the principles of the invention, if an oscilloscope, having vertical and horizontal deflecting means, has applied to the vertical deflecting means a voltage proportional to the range, expressed in feet, yards or other convenient units, ($v=kR$), and to the horizontal deflecting means a voltage proportional to the product of the range, expressed as described above, and the azimuth angle, expressed in radians, the latter proportionality being represented as greater than unity (for example, $h=n\alpha kR$, where $n>1$), a triangular sweep pattern is produced as the exploratory means of the system scans through its sector. In the above expressions, $v$ is vertical deflection, $h$ is horizontal deflection, $R$ is range, $\alpha$ is azimuth angle, $k$ is the range proportionality factor and $n$ is the azimuth proportionality factor.

When the vertical deflection voltage bias is sufficiently large that the range sweep, in effect, starts beyond the limit of the screen of the oscilloscope, a trapezoidal pattern results on the screen. Because of this, the display has been designated as a "trapezoidal B" type (or class) of display.

An ordinary or simple "type B" (or "class B") display, as is well known to those skilled in the art, comprises a rectangular display in which the horizontal dimension is a simple rectilinear function of azimuth and the vertical dimension is a simple rectilinear function of range. As will be demonstrated by typical curves shown in the accompanying drawings and described in detail below, a simple "type B" display is not desirable for the purpose of expanding a straight line course or trajectory in azimuth since it distorts the rectilinear course or trajectory into a curved course and reduces the facility with which extensions of the course, or trajectory, can be made.

The arrangements of the invention are of substantial use where it is desired to determine the position of a straight line course with respect to an observation point when a portion only, and particularly where only two points, of the course can be determined by the direction finding and ranging system.

By way of example, in tracing the trajectory of a mortar shell by a radar system two points along the trajectory can be spotted by the sector scanning radar system and the straight line projection on the earth's surface of the mortar shell trajectory can be indicated as will be described hereinafter. The point from which the shell was fired and the point at which it struck will both lie on the straight line projection of the trajectory at a distance which can be closely estimated from other data, used in conjunction with the projection, such as the type of shell being used, the ballistic data for the particular type of mortar being used, and the elevation at several points of the trajectory.

Arrangements of the invention are also of value in connection with sonic pulse-reflection ranging and distance determining systems for the submarine detection of torpedo trajectories or for tracing the course of a hostile submarine and the like.

A principal object of the invention is, accordingly, to improved arrangements for expanding the angular component of a rectilinear course indication without substantial distortion of its linear characteristics.

Other and further objects will become apparent during the course of the detailed description of embodiments of the principles of the invention, given hereinunder, and from the appended claim.

The principles of the invention will be more readily understood from the following description of illustrative embodiments of the invention taken in conjunction with the accompanying drawings in which:

Fig. 6 represents a typical plan position class indication of a straight line trajectory which has not been expanded in azimuth;

Fig. 7 illustrates the curvature of a straight line trajectory resulting when the conventional "B type" display with expanded azimuth dimension is employed; and Fig. 8 represents a sweep pattern of the invention embracing a 20-degree azimuth angle and showing the straight line trajectory of Fig. 6 in an expanded azimuth pattern.

Figure 1:
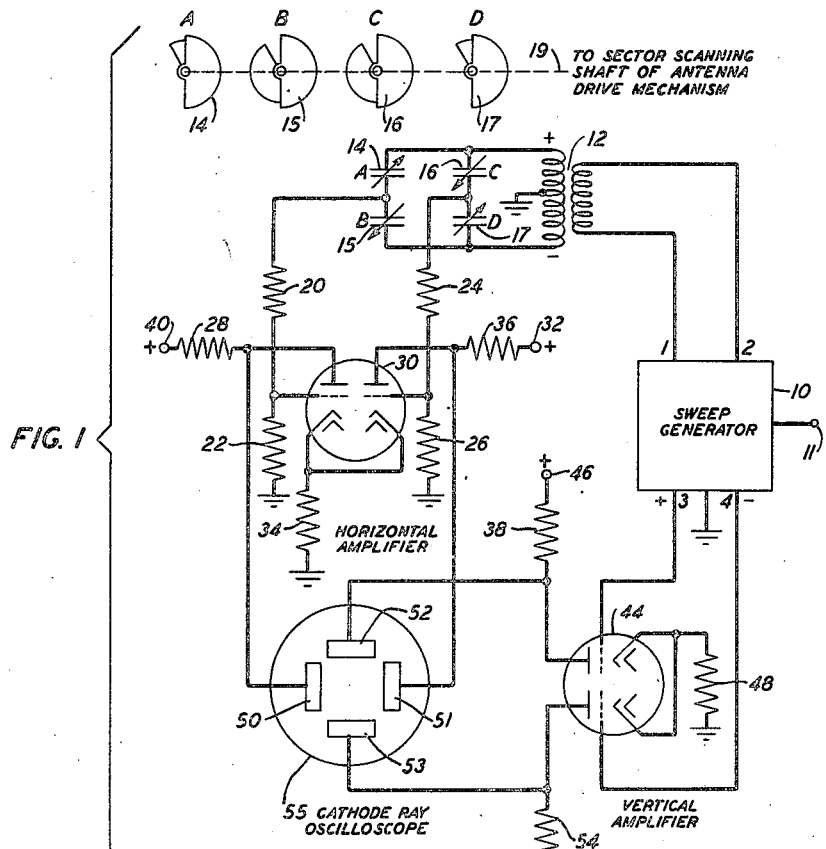
Fig. 1 shows, in electrical schematic diagram form, one form of deflecting circuit of the invention suitable for providing a "trapezoidal B" type deflection.

In more detail, in Fig. 1, sweep generator 10 provides a balanced linear sweep which can be synchronized, for example, with the emission of exploratory pulses from an associated radar system by providing control pulses from the synchronizer controlling the modulator or transmitter pulsing circuit of the radar, to terminal 11. See, for example, Fig. 16—1 on page 783 of "Radio Engineering" by F. E. Terman, third edition, published by McGraw-Hill Book Company, Incorporated of New York city, 1947. Generator 10 can be of the saw-tooth wave sweep type, well known to those skilled in the art, in connection with which the long linear inclined sweep portion of the "saw-tooth" is employed to deflect the ray of a cathode ray oscilloscope and the short "edge" of the saw-tooth returns the ray to its starting line or point, the ray normally being blanked out during this short "flyback" or "inter-trace" interval. (See, for example, Fig. 12.1(C) on page 436 of "Radar System Engineering" by L. N. Ridenour, published by McGraw-Hill Book Company, Incorporated of New York city, 1947. For an instance of the use of balanced saw-tooth sweep waves see copending application Serial No. 570,939 filed January 1, 1945, which matured into United States Patent 2,471,264, granted May 24, 1949, to W. H. Doherty, assignor to applicant's assignee.)

A balanced to ground output is drawn from terminals 3 and 4 of generator 10 and impressed upon the grid circuits of the balanced vertical amplifier, including the double triode vacuum tube 44. The cathodes of both triodes of this tube are connected to one end of resistor 48, the other end of resistor 48 being grounded. Resistor 48 provides an appropriate grid-cathode circuit biasing voltage drop for both triodes.

The anodes of the two triodes of tube 44 are connected through isolating resistors 38 and 54 to terminals 46 and 60, respectively, which terminals are connected to the positive terminal of a suitable source of anode potential (not shown). The negative terminal of the anode potential source employed should be grounded. The amplified sweep wave voltages from the anode circuits of vacuum tube 44 are impressed across the deflecting plates 52 and 53, respectively, of the cathode ray oscilloscope 55.

The use of balanced sweep amplifiers with cathode ray oscilloscopes in the manner described above is well known to those skilled in the art. It is exemplified, for example, in United States Patent 2,153,638, granted April 11, 1939, to N. C. Norman, assignor to applicant's assignee. The particular advantage of the use of such a balanced sweep arrangement is, of course, that it maintains a substantially uniform and sharp focus of the ray of the oscilloscope at all points on the oscilloscope screen.

Alternatively, an unbalanced saw-tooth sweep wave generator could be employed and the unbalanced input to balanced output sweep wave amplifier described and claimed in the copending application of E. A. Krauth, Serial No. 568,989, filed December 20, 1944, which matured into United States Patent 2,475,188, granted July 5, 1949, could then be used to provide balanced sweep voltages to the oscilloscope deflecting plates.

From terminals 1, 2 of sweep generator 10, an unbalanced saw-tooth wave sweep voltage is transmitted to the input winding of transformer 12. The output winding of this transformer is balanced and connected through a group of four variable capacitors 14 to 17, inclusive, and the two voltage dividers comprising resistors 20, 22 and 24, 26 respectively, to ground as shown in Fig. 1.

The four variable condensers 14 to 17 inclusive, connected as shown in Fig. 1, can be considered as forming a "square," the output winding of transformer 12 being connected across two opposite corners of the "square" and the horizontal amplifier including vacuum tube 30 being connected across the other two corners of the "square." The "square" of variable condensers, as will become apparent during the course of the following description, is in the nature of a modulating means which is employed to modulate the range sweep voltage, furnished via transformer 12, from generator 10.

The grids of the balanced horizontal amplifier, including the double triode vacuum tube 30, are connected to the junction points between resistors 20, 22 and resistors 24, 26, respectively, of the voltage dividers, as shown in Fig. 1. The cathodes of the two triodes of vacuum tube 30 are connected together and to one end of the resistor 34. The other end of resistor 34 is grounded. Resistor 34 contributes an appropriate biasing voltage drop to the grid-cathode circuits of both triodes.

The anodes of both triodes of the vacuum tube 30 are connected through isolating resistors 28 and 36, to terminals 40 and 32, respectively. Terminals 40 and 32 are connected to the positive terminal of a suitable source of anode potential (not shown). The negative terminal of the anode potential source employed should be grounded. The amplified sweep wave voltages from the anode circuits of vacuum tube 30 are impressed across the deflecting plates 52, 53, respectively, of cathode ray oscilloscope 55.

The rotor plates of the four variable capacitors 14 to 17, inclusive, of the "square" are all mechanically connected to a shaft 19 which shaft is connected in turn to the sector scanning shaft of the antenna drive mechanism of an associated radar system.

The "square" of condensers constitutes a balanced modulating circuit which causes the amplitude of the sweep voltages applied to the grids of tube 30 to vary in accordance with the angular position of the antenna.

For the antenna in the midposition of the sector being scanned the values of all four capacitances will be equal and no voltage will be applied to either grid of tube 30.

If the antenna is at an angle to the right of the center the capacities of condensers A and D will be smaller than those of condensers B and C. Consequently a positive sweep voltage will be applied to the left-hand grid of tube 30 and a negative counterpart of that voltage will be applied to the right-hand grid. The amplitudes of these voltages will, of course, be proportional to the angle $\alpha$. Analogously when the antenna is at an angle $\alpha$ to the left of the center, the capacities of condensers B and C will be smaller than those of condensers A and D. Consequently a positive sweep voltage will be applied to the right-hand grid of tube 30 and a negative counterpart of that voltage will be applied to the left-hand grid.

Appropriate radar systems with which the arrangements of the invention can, obviously, be readily adapted for use are, by way of example, that shown in the copending joint application of applicant and B. Ostendorf, Serial No. 47,064, filed August 31, 1948, concurrently with this application, which joint application matured into United States Patent 2,546,370, granted March 27, 1951; that shown in Fig. 12.1 on page 436 of "Radar System Engineering" by F. E. Terman, mentioned above; and that shown in the above-mentioned copending application of W. H. Doherty; as well as innumerable others, well known to those familiar with the radar art.

To recapitulate, the linear sweep voltage from transformer 12 is modulated or divided by the "square" of capacitors 14 to 17, inclusive, so that the control grids of vacuum tube 30 are driven by voltages the amplitude of which is proportional to antenna displacement from its central position, and the polarities of which are determined according to the side of center to which the antenna is displaced, each voltage being the counterpart of the other and of opposite polarity.

Figure 2:
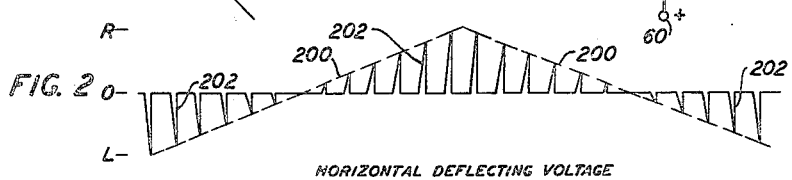
Figs. 2 and 3 are diagrams representing the horizontal and vertical deflecting voltages, respectively, employed in the arrangement of Fig. 1.

The sweep voltage applied across the horizontal deflecting plates 50, 51, can, therefore, be represented by a series of pulses 202, shown in Fig. 2, the amplitude envelope of which is the "double saw-toothed" curve 200 indicated by the "dash" lines of Fig. 2, it being borne in mind that the voltage on one plate is the counterpart of that on the other, as described in detail above.

Figure 3:
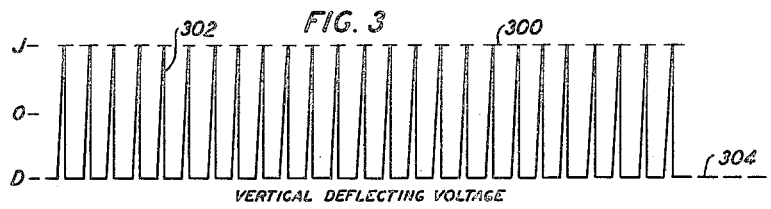

The simple range sweeps applied to the vertical deflecting plates 52, 53, are, of course, of uniform maximum amplitude and of the character indicated by pulses 302 of Fig. 3, extending between the limits represented by the horizontal "dash" lines 300 and 304. The voltage on one plate is, of course, the counterpart of that on the other.

Figure 4:
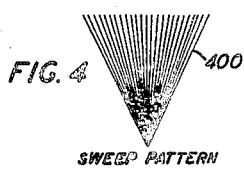
Fig. 4 represents, to a reduced scale, a sweep pattern for the arrangement of Fig. 1.

Were the beam of the oscilloscope adjusted to sufficient brightness to leave visible traces on the screen during a complete scanning operation of the antenna, a sweep pattern as shown in Fig. 4 would result in which a plurality of traces 400 radiate from a common vertex point to form a triangular-shaped figure.

Figure 5:
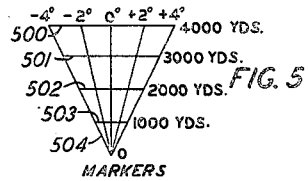
Fig. 5 represents, to a reduced scale, an arrangement of azimuth and range markings suitable for use in a pattern of the type indicated by Fig. 4.

If range and azimuth angle marking pulses are provided, in any of the numerous ways well known to those skilled in the art, the normal ray intensity being adjusted to leave no visible trace in the absence of a marker pulse, (or received signal) then a pattern of the general character indicated in Fig. 5 will be obtained. In Fig. 5, the horizontal lines 500 to 503, inclusive, represent range marker lines at (for example) ranges of 1,000, 2,000, 3,000 and 4,000 yards, respectively. The five radial lines 504 represent azimuth angles of 0 degree (which, for example, can be any arbitrarily selected reference azimuth angle) and $\pm$ 2 degrees and $\pm$ 4 degrees, respectively, as indicated in Fig. 5. ("Negative" angles are those to the left of the "zero" (or reference) azimuth, and "positive" angles are those to the right, as shown in Fig. 5).

In Fig. 6 the straight line (or rectilinear) projection 602 of a mortar shell trajectory as defined by two reflected signals 604, 606 is shown as it would appear in an ordinary P. P. I. type (or class) indication in which the angular direction of sweep is made to coincide at all angles with the actual angular position of the scanning antenna as it passes across the sector. In Fig. 6 a scan of from +10 degrees to −10 degrees is illustrated. The rectilinear projection 602 of the shell trajectory is obtained simply by drawing a straight line through the spot indications 604 and 606 (or laying a straight-edged rule or cursor so that its edge passes through indications 604 and 606). Alternatively the range and azimuth coordinates of the target appearances can, of course, be transferred to a chart or topographic map and the extension of the trajectory made thereon.

In Fig. 7 trajectory 702 illustrates the curvature which results in the projection of the trajectory 602 of Fig. 6 if the indication employed is of the "B" type (or class), well known to those skilled in the radar art. In this type of indication the azimuth angle is simply expanded by a constant factor for all ranges so that lines of equal azimuth angle are simple vertical straight lines. Obviously the problem of determining the proper curvature for the trajectory 702 and of extending it to fix the probable position of the mortar or the probable point at which the shell struck the earth are very substantially more complex than where a straight line projection can be used. It would be necessary to obtain more than two points to define the curve and the validity of extensions of the curve beyond the end points for which observations could be obtained would always be open to question.

These difficulties can be resolved by the arrangements of the invention, as illustrated in Fig. 8, in which the azimuth sweep is made proportional to the range, by sweep arrangements of the general character illustrated in Fig. 1, so that points of equal azimuth lie on a radius emanating from a common point for all such radii of equal azimuth angle locii. In this case trajectory 802, corresponding to trajectory 602 of Fig. 6, is again a substantially straight line and can be determined by two indications 804 and 806. Also extensions of the trajectory are merely extensions of the straight line 802 and questions as to their validity do not arise.

Numerous other arrangements within the spirit and scope of the invention will occur to those skilled in the art. For example, variable inductors (variometers) or resistors (potentiometers) can be employed in place of the variable capacitors of Fig. 1 and sonic ranging and directional systems can be employed rather than radar systems and numerous other variations in the detailed apparatus and the detailed arrangement thereof, can be easily devised without departing from the spirit and scope of the invention. The above-described arrangements are merely illustrative of the general method of applying the principles of the invention.

What is claimed is:

An indicating circuit comprising a cathode ray oscilloscope having horizontal and vertical deflecting plates, two balanced amplifiers the output of one being connected to said horizontal deflecting plates, the output of the other being connected to said vertical deflecting plates, a sweep generator, a square of four variable impedances, each of said variable impedances having a variation control, and a fifth control, all of said first four controls being ganged to move subject to adjustment of said fifth control, said sweep generator connecting directly to the input of one of said amplifiers, said sweep generator connecting to two opposite corners of said square of four variable impedances, the other two corners of said square being connected to the input of said other of said two amplifiers.

References Cited in the file of this patent

UNITED STATES PATENTS

| Number | Name | Date |
| --- | --- | --- |
| 2,135,171 | Chireix | Nov. 1, 1938 |
| 2,153,638 | Norman | Apr. 11, 1939 |
| 2,403,429 | Anderson | July 9, 1946 |
| 2,420,303 | De France | May 13, 1947 |
| 2,421,312 | Bobb | May 27, 1947 |
| 2,421,521 | Poch | June 3, 1947 |
| 2,426,217 | Hoisington | Aug. 26, 1947 |
| 2,433,002 | Norton | Dec. 23, 1947 |
| 2,437,286 | Witt | Mar. 9, 1948 |
| 2,459,481 | Wolff et al. | Jan. 18, 1949 |
| 2,480,208 | Alvarez | Aug. 30, 1949 |
| 2,585,855 | Sherwin et al. | Feb. 12, 1952 |